United States Patent Office 3,515,641
Patented June 2, 1970

3,515,641
PROTEOLYTIC ENZYMES
Donald R. Whitaker, Ottawa, Ontario, Canada, assignor to Canadian Patents and Development Limited, Ottawa, Ontario, Canada, a corporation of Canada
No Drawing. Filed Dec. 5, 1966, Ser. No. 598,952
Int. Cl. C07g 7/28; C12d 13/10
U.S. Cl. 195—62
18 Claims

ABSTRACT OF THE DISCLOSURE

Two proteolytic enzymes have been isolated from a species of myxobacteria (Sorangium), purified and characterized. Both enzymes have bacteriolytic and fibrinolytic properties and exhibit activity against certain nematodes and cestodes.

---

Certain soil bacteria believed to be of the family Myxobacterales and of the genus Sorangium have been found to produce two bacteriolytic proteases of different structure and properties. Processes have been developed for the separation and recovery of both enzymes.

Strains of Sorangium have been known to produce extracellular enzymes (see Gillespie and Cook, Can. J. Microbiology 11, 109, 1965). A protease and a "lysin" were described as produced by strains of myxobacteria including Sorangium, particularly strain number 495. The protease had hydrolytic action on casein and denatured hemoglobin but did not lyse bacterial cell walls; and the "lysin" caused lysis of various species of bacteria but was claimed to be not a protease.

According to the present invention two distinct proteolytic enzymes having lytic activity against bacteria have been isolated from culture filtrates of Sorangium. The $\alpha$-enzyme is a serine-protease with the amino acid sequence —Asp—Ser—Gly— at the reactive serine residue. It thus belongs to the same group of serine proteases as all pancreatic serine proteases of known sequence (e.g. trypsin, chymotrypsin) and not to the group characterized by the sequence —Thr—Ser—Met— which has been thought to include all microbial serine proteases. The $\beta$-enzyme cannot be placed in any of the main groups of known proteases.

The myxobacteria Sorangium strains used are maintained in the culture collection at the Microbiology Research Institute, Canada Department of Agriculture, Ottawa. The strain designated 495 produces good yields of the extracellular enzymes, but other strains such as I8L are also operative. The strains of this type producing significant amounts of extracellular enzymes are operative here.

The organism (Sorangium) may be grown in shake or submerged culture in an aerated aqueous medium containing assimilable carbon and nitrogen sources and mineral salts. Suitable nitrogen sources include mixtures of organic and inorganic nitrogen compounds such as acid hydrolyzed casein and the nitrates. Suitable carbon sources include carbohydrates such as glucose. The mineral salts include phosphates, sulfates, chlorides and metals such as Fe, Mg, K, Na and traces amounts of zinc. The growth temperature may range from about 20 to 35° C. with about 25° C. preferred. Enzyme buildup is substantially complete after about 40 to 50 hours although somewhat shorter times may suffice.

The cells are separated after incubation, for example, by centrifugation and the cell-free solution is treated as outlined below to recover the two enzymes. It has been found desirable to pass the filtrate through a mixed bed of ion exchange resins which have been neutralized preferably by monovalent acids and bases (e.g. the cation exchanger in ammonium form and the anion exchanger in acetate form) to remove divalent and multivalent ions. The filtrate is acidified (e.g. brought to a pH below about 5 with acetic acid) and contacted at this pH with a cation exchange resin to adsorb the enzymes. This treatment removes practically all bacteriolytic activity; the residual solution contains substantial amounts of proteolytic activity which can be recovered by similar adsorption at a lower pH (e.g. about 4). A suitable cation exchange resin is a weakly acidic carboxylic type such as Amberlite CG–50, preferably finely divided and equilibrated with buffer (e.g. sodium hydroxide- acetic acid of pH 5.5 or less and ionic strength 0.1 or less). If desired (after removing resin from filtrate), both enezymes can be stripped from the resin in one operation e.g. by dispersing the resin in a buffer or salt solution such as 0.2 to 0.4 M NaOH-citric acid buffer of pH about 6.5 to 7.5 adding ammonia or base until the pH of the dispersion is approximately 7. The resulting enzyme solution can be freeze dried without loss of enzyme activity. This enzyme mixture could be used in any application where a combined action of both $\alpha$- and $\beta$-enzymes is desirable e.g. animal antihelminthic or wound treatment.

All the proteolytic activity can be removed for the original filtrate by adsorption on the resin at a lower pH (e.g. about 4) and desorbing all activity, as described above. This recovered enzyme could be used where the combined action of all proteolytic enzymes is desirable.

To recover the adsorbed $\alpha$- and $\beta$-enzymes the resin is first washed with dilute buffer such as 0.1 M NaOH-acetic acid pH 5, to remove contaminants without loss of enzyme. The resin is then dispersed in buffer of ionic strength 0.1 or less and alkali is added until the pH of the dispersion is slightly less than neutrality (6–7). The enzymes can then be displaced from the resin with more concentrated buffers either by gradient displacement (see Example 2) or by stepwise displacement (see Example 3). The $\beta$-enzyme is displaced first. The enzymes can be refractionated by similar procedures after readsorption on fresh resin. The final products can be precipitated e.g. with ammonium sulfate, and dialyzed free of salt. The $\beta$-enzyme has been crystallized by precipitation with ammonium sulfate.

In general, the enzymes may be adsorbed from buffer solution of ionic strength not more than about 0.1 at a pH not greater than about 5. The resin with adsorbed enzymes can be washed with buffers of similar ionic strength at pH up to about 5.5 without significant removal of $\alpha$- and $\beta$-enzymes. A partial neutralization of the resin with adsorbed enzymes is desirable using a buffer of low ionic strength but with the pH raised preferably to about 6 to 6.5. The enzymes may then be desorbed by buffers or salt solutions of ionic strength greater than 0.1 with a pH at about 5.5 to 6.5 (or above). Preferred buffers for desorbing the $\beta$-enzymes are of about 0.14 to 0.2 M (in terms of monovalent cation) and of pH 5.5 to 6.5 (more preferably 5.7–6.2). Buffers for desorbing the $\alpha$-enzyme are preferably of 0.25 to 0.35 M in monovalent cation (more preferably 0.25 to 0.3 M) and of the same or slightly increased pH (within the same ranges) as for $\beta$-enzyme.

On electrophoresis in tris buffer of pH 8 the $\alpha$-enzyme migrates slightly faster than egg-white lysozyme, the $\beta$-enzyme slightly slower. The absorptivity (UV) of the $\alpha$-enzyme at 280 m$\mu$ (millimicrons) was estimated to be approximately 0.9; that of the $\beta$-enzyme approximately 2.0. The $\beta$-enzyme has the lower $\lambda_{max}$ and the higher absorptivity between 260 and 300 m$\mu$.

Both the $\alpha$- and $\beta$-enzymes have molecular weights of approximately 20,000. They are both water-soluble basic proteins with completely different amino acid compositions. The following table gives the amounts of several components in each enzyme (see Table 1).

As produced and isolated in this laboratory, the β-enzyme contains 1 atom of zinc but the zinc can be removed (e.g. by treatment with o-phenanthroline) without loss of lytic activity. The zinc can be replaced by a divalent metal ion. The α-enzyme is readily inhibited by diisopropyl phosphorofluoridate (DFP) but not the β-enzyme.

Both α- and β-enzymes are proteolytic i.e. both hydrolyze casein, fibrin and the B chain of oxidized insulin. The α-enzyme has the greater proteolytic activity towards all three substrates. At pH 9, the α-enzyme rapidly cleaves the B chain of oxidized insulin at the linkage between amino acid residues 18 and 19, and at the linkages between 12 and 13, and 14–15. Under the same conditions, the β-enzyme cleaves the B chain rapidly between residues 23 and 24, and more slowly between 18 and 19. The linkages split by both enzymes all involve the carbonyl group of a neutral amino acid. In this respect they resemble pancreatic elastase. Both enzymes solubilize fibrin at physiological pH's (7–8).

TABLE 1.—MOLES OF COMPONENTS PER MOLE OF ENZYME (TO NEAREST INTEGER)

| Component (residues) | α-Enzyme | β-Enzyme |
| --- | --- | --- |
| Histidine | 1 | 8 |
| Lysine | 2 | 3 |
| Arginine | 12 | 5 |
| Half cystine | 6 | 4 |
| Leucine | 10 | 9 |
| Tyrosine | 4 | 13 |
| Isoleucine | 8 | 4 |
| Thiol groups | 0 | 0 |
| Zinc | 0 | 1 |

Both enzymes have bacteriolytic properties. They hydrolyze linkages of bacterial cell-wall mucopeptides. The β-enzyme is the more active. Low concentrations (about 1 μg./ml. of the β-enzyme lyse suspensions of *Arthrobacter globiformis* cells completely, and moderately higher concentrations lyse *Micrococcus lysodeikticus* cells completely within one hour. Corresponding concentrations of the α-enzyme lyse the suspensions incompletely, but slightly higher concentrations (about 10 μg./ml.) give complete lysis of *A. globiformis* cells. The bacteriolytic activity does not depend upon cleavage of glycosidic linkages in the cell-wall mucopeptide (as is the case with lysozyme) but upon cleavage of amide or peptide linkages in the cell wall.

The β-enzyme shows strong antinematode activity for example against *Ascaris lumbricoides* (a parasite of man and pigs), and against larval oesophagostoma which in the adult form parasitize sheep, while the α-enzyme attacks parasitic cestodes such as the sheep tapeworm *Moniezia expansa* (see Examples 9 and 10). Mixtures of the two enzymes would be a useful antinematode preparation. Neither enzyme has shown toxicity on oral administration to rats in preliminary tests.

By the above procedures, enzyme preparations can be obtained which (a) include all the proteases in the filtrate, (b) mixtures of the α- and β-enzymes, and (c) the α- or β-enzyme alone. The combination of proteolytic (and fibrinolytic) activity, bacteriolytic activity, anti-helminthic activity plus activity against free-living nematodes, represents usefulness for hydrolysis of various proteins, lysis of bacteria, debridement of wounds, clearing of clotted fibrin, and combatting infestations of parasitic helminths and other nematodes. The enzymes are stable on storage e.g. at 4° C., can be freeze dried and kept frozen for periods up to at least one year without loss of activity.

The following examples are illustrative of various aspects of the invention.

EXAMPLE 1

Culture filtrate preparation (a) Cultures of Sorangium sp. (isolate No. 495) were maintained on slopes of 0.2% tryptone=1% agar. After 2 days growth at 25°, the cultures were stored at refrigerator temperatures.

The composition of the culture medium (in grams/liter) was as follows: Casamino acids, 10; glucose, 1; $K_2HPO_4$, 1; $KNO_3$, 0.5; $MgSO_4·7H_2O$, 0.2; NaCl, 0.1; $FeCl_3·6H_2O$, 0.01; and NaOH to adjust the pH to 7.0–7.1 if necessary. Trace amounts of zinc were present.

Calcium chloride was omitted from the previously used medium because Sorangium is less prone to autolysis in the calcium-free medium. Yeast extract was omitted because it interferes with subsequent purification procedures.

The organism was grown at 25° in three stages in 2800-ml. Fernbach flasks, containing 500–1000 ml. of medium. This culture provided the inoculum for 12-liter flasks, each containing 6 liters of medium. The 12-liter flasks, in turn, provided the inoculum for a fermentor containing 120 liters of medium. The inocula for the Fernbach flasks were dispersions in sterile water of the growth from a 24-hour slope culture on culture medium-1.5% agar. The Fernbach flasks and the 12-liter flasks were shaken by a rotary shaker which described a circle of 1 inch diameter at 113 r.p.m. The fermentor was of stainless steel construction and was approximately 2 ft. in internal diameter. The air inlet was a 1-inch pipe mounted just above and directed at the stirrer, a 10-inch disk with eight radial fins, rotating at 580 r.p.m.

At the end of the growth period, the contents of the ferementor were passed through a supercentrifuge to remove cells, and the filtrate treated as in Example 2.

(b) The Soranquim organism was grown at 25° in three states of shake-cultures. Zinc chloride (1 mg./1) was made a component of the growth medium as, according to assays of lytic activity, it increased the production of β-enzyme (a zinc-protein). The first two stages (24 hr. each) were in flasks plugged with cotton-wool: 500 ml. flasks with 75 ml. of medium, inoculated from a 24 hr. slope-culture, for the first stage and 10.1 flasks with 2 l. of medium, inoculated with 75 ml. of the preceding shake culture, for the second stage. The glucose was autoclaved separately when the media for these two stages was prepared. The third stage (48 hr.) was in 40 l. carboys equipped with stoppers and inlet airfilters. Each contained 12 l. of medium. The carboys themseves were autoclaved, as were concentrated soutions of (a) the glucose, (b) the Casamino acids, (c) zinc chloride, ferric chloride and magnesium sulfate, and (d) the other mineral salts of the medium but most of the water was unsterilized glass-distilled water. The inoculum was 1 l. of the preceding flask stage. Filtered, acid-scrubbed air was passed over the surface of (not through) the medium. Four carboys were inoculated at one time.

The above procedures require no autoclaving of large volumes of water and raise no problems with regard to foam-control or pH control. Cultures of Soranquim sp. are less subject to contamination than those of most microorganisms but, with only partial sterilization of the medium in the last stage, it is essential that the inoculum be heavy and in vigorous growth. The 48 hr. culture was centrifuged to remove cells.

EXAMPLE 2

The filtrate from Example 1 was contacted with mixed-bed ion exchange resin. Amberlite IR45 (acetate) (1100 ml.) and 900 ml. of Amberlite IR120 ($NH_4^+$) were added to the 130 liters of filtrate, and the dispersion was left to cool to 5° C. The supernatant solution was filtered through 200 ml. of each resin. The resin used for the initial treatment was drained on the filter and washed with water. The main aim of this step was removal of di- and tri-valent ions.

This and all subsequent steps were carried out in a cold room at approximately 2° C. The filtrate from the previous step was brought to pH 4.95 by the addition of 2200 ml. of 20% acetic acid. Two liters (settled volume) of Amberlite CG50, which had been equilibrated with 0.10 M sodium hydroxide-acetic acid buffer of pH 5.00 was added, with vigorous stirring, in small portions and left to settle overnight. The supernatant solution was removed, and the resin was dispersed in 14 liters of the above-mentioned acetate buffer and again left to settle. Finally it was washed once more with 9 liters of buffer.

The resin was dispersed in 4 liters of 0.033 M citric acid-sodium hydroxide buffer of pH 6.25 and the pH of the dispersion was brought to 6.25 by capillary inflow, with stirring, of approximately 2 liters of 0.5 N sodium hydroxide. The dispersion was added to a large column (12 cm. inside diameter) which already contained a 4-cm. bed (about 500 ml.) of Amberlite CG50 that had been equilibrated with similar citrates buffer. The column was left to drain overnight, the residual supernatant solution above the resin was removed, and the resin was washed on the column by 2 liters, followed by 0.8 liter, of 0.033 M citric acid buffer.

One liter of the above 0.033 M citric acid buffer was added to the colum. A polyethylene inlet plunger was immediately inserted, locked into position, and connected to a pump. The subsequent inflow of buffer, extending over 10 days at a flow rate of 90 ml./hour, was as follows. (i) The first 10 liters contained an exponential gradient of sodium citrate. The gradient was generated by three 5-liter vessels connected in line at their bases; vessel 1 was equipped with a stirrer and connected to the pump. At the start, vessel 1 contained 5 liters of 0.05 M trisodium citrate-citric acid buffer of pH 6.25; vessels 2 and 3 each contained 5 liters of 0.10 M trisodium citrate buffer of the same pH. (ii) The second 10 liters had a linear gradient from 0.10 M to 0.15 M trisodium citrate-citric acid of pH 6.25. (iii) The final 3 liters was the above-mention 0.15 M buffer.

After this treatment, the resin from the column was dispersed in 3 liters of 0.15 M citrate buffer and the pH of the dispersion was brought to 7.2 with sodium hydroxide. The resulting extract had negligible lytic activity.

The results of the gradient displacement show lytic activity is displaced in two peaks. As shown by the electrophoretic patterns, the $\beta$-enzyme is the major component of the first peak and the $\alpha$-enzyme that of the second. Differences in $\lambda_{max}$ of the ultraviolet absorption spectrum are also evident. [Peak absorptions for $\alpha$ at 280 m$\mu$ and $\beta$ 277 m$\mu$].

EXAMPLE 3

The procedures up to and including adsorption of the enzyme on the resin were unchanged from Example 2. Eight hundred ml. (settled volume) of Amberlite CG50 adsorbed the enzyme from 4 carboys. The settled resin was washed as before with 0.100 M sodium hydroxide-acetic acid buffer of pH 5.00.

The major change in the following stages from Example 2 was to replace gradient displacements by stepwise displacements. Gradient generators, pumps, and inlet plungers are not required but, with reliance on comparatively small hydrostatic pressures to drive buffer through the resin, it is important that the resin be on a support which cannot become plugged by the small resin particles. The following steps were carried out in a cold room at 2° C.

The washed resin, containing enzyme from approximately 100 l. of medium, was dispersed in 3 l. of cold-.033 M-citric acid-sodium hydroxide buffer of pH 6.25 and brought to pH 6.4 by capillary inflow of 0.5 M sodium hydroxide (approximately 1800 ml.). The dispersion was added to a column which contained one liter of the above mentioned .033 M citrate buffer above a 2 cm. bed of resin which had been equilibrated with similar buffer. The resin was left to settle, and the buffer to drain to the top of the resin bed. The subsequent inputs to the column were:

(a) 4.2 l. of 0.160 M sodium hydroxide-citric acid buffer of pH 5.88; the last 3 l. of the effluent was designated "$\beta$-fraction."

(b) 1 l. of 0.210 M sodium hydroxide-citric acid buffer of pH 6.00; the first 500 ml. of effluent was added to the "$\beta$-fraction"; the last 500 ml. was designated "$\alpha$-$\beta$-fraction."

(c) 4.5 l. of 0.270 M sodium hydroxide-citric acid buffer of pH 6.20; the eluate was designated "$\alpha$-fraction."

As in Example 2 the $\beta$-enzyme was eluted first and the $\alpha$-enzyme followed. Typical absorbances were $$A_{280}^{1\,cm.}$$

of 1.2 for the "$\beta$-fraction" and 0.8 for the "$\alpha$-fraction" (absorbance per cm. of solution to light of 280 nanometer wavelength).

EXAMPLE 4

The $\alpha$- and $\beta$-fractions from two runs in Example 3 were combined for refractionation. The first steps were essentially the same as for the initial fractionations: the solutions were brought to pH 5.0 with acetic acid and mixed with a dispersion of Amberlite CG50 in acetate buffer: approximately 400 ml. (settled volume) of resin for the $\beta$-fraction and 500 ml. for the $\alpha$-fraction. The resin was washed with acetate buffer, and dispersed in 0.033 M citrate buffer. The dispersion was brought to pH 6.4 with 0.5 M sodium hydroxide and added to a column containing two layers of resin. The lower layer (2 cm.) was resin which had been equilibrated with 0.033 M citric acid-sodium hydroxide buffer of pH 6.25; the upper layer (7 cm.) was resin which had been equilibrated similarly but, before addition to the column, had been titrated to pH 6.4 with 0.5 M sodium hydroxide. One liter of the 0.160 M buffer, followed by 6 l. of the 0.270 M buffer was used for displacement of the $\alpha$-enzyme and 3 l. of the 0.033 M buffer followed by 4 l. of the 0.160 M buffer was used for displacement of the $\beta$-enzyme. The enzyme in effluent with an absorbance greater than about one third of the maximum absorbance of the peak was then precipitated and dialyzed.

Typical yields of salt-free, freeze-dried enzyme from such refractionations were 4–4.5 g. of $\alpha$-enzyme and 2 g. of $\beta$-enzyme. The extent of cross-contamination is extremely low.

EXAMPLE 5

Purification of the $\alpha$-enzyme

Step 1.—*Precipitation with ammonium sulfate and extraction of precipitate.*—Fractions with effluent volumes between 10.3 and 16.5 liters from Example 2 were combined, brought to pH 8.2 with dilute ammonia, brought to roughly 60% saturation with ammonium sulfate (455 g. of ammonium sulfate per liter of effluent), left in an ice bath for 48 hours, and centrifuged for 30 minutes at 22,000×g. The supernatant solution was discarded. The sediment was stirred with about 90 ml. of H$_2$O to give a turbid solution which was centrifuged for 30 minutes at 78,000×g; the sediment was reextracted as before with about 10 ml. of water and recentrifuged. The supernatant solutions from the two extractions were combined and diluted with 30 ml. of 0.230 M sodium hydroxide-citric acid buffer of pH 5.81.

Step 2.—*Solvent exchange in columns of Sephadex G25.*—The solution of enzyme from step 1 was added in loads of 30–40 ml. to a 2.8 x 66 cm. column of coarse-porosity Sephadex G25 which had been washed thoroughly with the above citrate buffer. The enzyme was eluted with the same buffer at a flow rate of 15 ml./hour. The effluent with an elution volume from 130 to 255 ml. was used in the next step. Apart from exchanging solvent, this step eliminates a faint yellow color from the enzyme solution.

The recovery of lytic activity in steps 1 and 2 was about 95%.

Step 3.—*Rechromatography on Amberlite CG50.*—The upper section of the column used for this refraction was of 5.5 cm. inside diameter, the middle section was 5.7 cm. long and of 2.4 cm. inside diameter, and the lower section was 4 cm. long and of 1.6 cm. inside diameter. The resin, with a bed volume of 130 ml., had been equilibrated with 0.230 M sodium hydroxide-citric acid buffer of pH 5.81. The gradient was generated by a nine-chamber autograd, with 100 ml. of buffer in each compartment. The buffers were sodium hydroxide-citric acid buffers of the following pH's and molarities with respect to sodium hydroxide: pH 5.82, 0.230 M (chambers 1, 2 and 3); pH 5.80, 0.263 M (chamber 4); pH 5.75, 0.296 M (chambers 5 and 6); pH 5.73, 0.323 M (chamber 7); pH 5.70, 0.350 M (chambers 8 and 9).

For the refractionation to be illustrated, the input to the column was in 69 ml. of solution from step 2. The enzyme, followed by a few milliliters of 0.230 M buffer, was left to flow in under gravity. Fifteen milliliters of 0.230 M buffer was then added to the column, and a polyethylene inlet plunger was inserted. The inflow of buffer from the pump connected to the autograd was 20 ml./hour. Sharp separation of $\alpha$-enzyme was realized. The recovery of lytic units is approximately 95%.

Step 4.—*Precipitation and dialysis.*—Enzyme in fractions with effluent volumes between 400 and 650 ml. was precipitated with ammonium sulfate as in step 1, dissolved in 0.1 M potassium chloride, and centrifuged as in step 2. It was dialyzed in 3- to 4-ft. lengths of ¼-inch dialysis tubing. The tubing was suspended in glass columns of 1-inch inside diameter, through which a slow downward flow of 0.1 M potassium chloride was passed for 24 hours followed by glass-distilled water for 2 days. The dialyzed enzyme was stored at $-15°$ C.

EXAMPLE 6

Purification of $\beta$-enzyme

Steps 1 and 2.—Fractions from Example 2 with effluent volumes between 3.1 and 7.8 liters were combined and treated as in steps 1 and 2 of Example 5, with the following differences. (a) The enzyme was precipitated by ammonium sulfate at approximately 90% saturation. (b) The sediment from the first extraction with water was dialyzed against 0.1 M KCl to complete the solubilization of $\beta$-enzyme. This point is important, as the precipitated $\beta$-enzyme tends to dissolve less readily than its impurities and incomplete extraction reduces enrichment as well as yield. (c) The citrate buffer for step 2 and for the last stage of step 1 was 0.160 M NaOH-citric acid buffer of pH 5.80.

Step 3.—*Rechromatography on Amberlite CG50 by stepwise displacement.*—The column was as described in step 3 of Example 5. The resin, with a bed volume of 97 ml., was equilibrated with 0.160 M sodium hydroxide-citric acid buffer of pH 5.80. The load for the fractionation to be illustrated, 1700 absorbance units in a volume of 288 ml., was added by gravity flow and followed by 38 ml. of buffer. The inlet plunger was inserted, with 50 ml. of 0.160 M buffer above the resin. The subsequent inflow of buffer, at 20 ml./hour, was as follows: 400 ml. of 0.200 M NaOH-citric acid, 200 ml. of 0.205 M NaOH-citric acid, and 1200 ml. of 0.210 M NaOH-citric acid, all of pH 5.77.

Step 4.—*Removal of trace impurities by precipitation of the enzyme with ammonium sulfate.*—The enzyme was precipitated at pH 8 by 65% saturation with ammonium sulfate, left to settle for 24 hours at 0°, and centrifuged for 30 minutes at $50,000\times g$. The sediment was stirred for 1 hour at 0° with 20 ml. of a 40% saturated solution of ammonium sulfate and recentrifuged as above. This extraction was repeated twice. The supernatant solutions were discarded. The final sediment was then stirred with 20 ml. of 0.2 M potassium chloride and recentrifuged. The supernatant solution, containing 91% of the absorbance units in the original effluent, was dialyzed for 24 hours against glass-distilled water by the procedure in step 4 of Example 5. The dialyzed solution was mixed with one-ninth its volume of 0.200 M potassium hydroxide-phosphoric acid buffer of pH 6.5 on 1:10 dilution. The solution was brought to 38% saturation by capillary inflow of a 90% saturated solution of ammonium sulfate containing a 1:10 dilution of the same potassium phosphate buffer. The resulting slight precipitate was left to settle for 24 hours at 0° and removed by centrifugation for 30 minutes at $50,000\times g$. The supernatant solution was then brought to 60% saturation with ammonium sulfate by inflow as above. After 24 hours at 0°, the precipitated enzyme was removed by centrifugation, dissolved in 14 ml. of 0.1 M potassium chloride, and recentrifuged. The supernatant solution was dialyzed against 0.1 M potassium chloride and glass-distilled water as in Example 5 and stored at $-15°$. The final recovery of absorbance units was 70% of the absorbance units in the original effluent. The electrophoretic pattern showed only one component at loads similar to those tested for the $\alpha$-enzyme.

$\beta$-Enzyme, prepared as above, crystallized in low yield during a dialysis against 0.1 M hydrochloric acid-tris buffer of pH 8.0. It has been crystallized, with high recovery of absorbance and lytic units, from 0.10 M sulfuric acid-tris buffer of pH 8.0, at 10% saturation with ammonium sulfate. The crystals were colorless needles with maximum lengths of about $50\mu$.

EXAMPLE 7

The $\beta$-enzyme was almost completely freed of zinc by washing the enzyme in an ultrafiltration cell with $10^{-3}$ M o-phenanthroline in 0.01 M acetate buffer of pH 5.5. This treatment had no effect on lytic activity and did not increase the titer for thiol groups ($<0.1$). A divalent metal ion was subsequently replaced in the enzyme molecule by dialysis against a solution containing the metal ion.

Inhibition by DFP was tested on solutions of enzyme in 0.2 M phosphate buffer of pH 7.7. Treatment of the $\beta$-enzyme for 4 hours with a tenfold excess of DFP had no effect on lytic activity; the zinc-free enzyme was equally insensitive. Treatment of the $\alpha$-enzyme with 2.5 mole of DFP per mole of enzyme gave a 95% inhibition of lytic activity within 10 minutes and complete inhibition within an hour. The inhibited enzyme was dialysed and then hydrolysed for 20 hours with 2 N HCl at 100°. The yield of serine phosphate, 0.375 mole/mole of enzyme is consistent with an esterification by DFP of 1 serine residue of the $\alpha$-enzyme.

EXAMPLE 8

Substrate:
  1 mg. of purified bovine fibrin per 5 ml. of buffer
Enzyme
  $\alpha 1$—100 µg. of $\alpha$-enzyme/5 ml.
  $\alpha 2$—3 µg. of $\alpha$-enzyme/5 ml.
  $\beta 1$—100 µg. of $\beta$-enzyme/5 ml.
  $\beta 2$—3 µg. of $\beta$-enzyme/5 ml.
Temperature=25.0° C.

TABLE 2
[Absorbance at 660 m$\mu$]

| Buffer—Phosphate buffer of pH 7.0 and ionic strength 0.05 | | | | Tris buffer of pH 8.0 and ionic strength 0.05 | | | |
|---|---|---|---|---|---|---|---|
| Enzyme $\alpha 1$ | $\alpha 2$ | $\beta 1$ | $\beta 2$ | $\alpha 1$ | $\alpha 2$ | $\beta 1$ | $\beta 2$ |
| Reaction time: | | | | | | | |
| 0 ........ 0.39 | 0.39 | .39 | .39 | .39 | .39 | .39 | .39 |
| 10 min... .20 | .34 | .35 | .37 | .13 | .33 | .32 | .36 |
| 60 min... .07 | .26 | .30 | .34 | .05 | .22 | .26 | .33 |
| 210 min... .05 | .16 | .25 | .32 | .02 | .11 | .18 | .30 |

Both enzymes are seen to render the fibrin dispersions more clear (or to solubilize fibrin) with the α-enzyme the more active.

EXAMPLE 9a

Action on parasitic helminths; tests on *Ascaris lumbricoides*

Test system—4 living ascarids in 1 l. beakers containing 100 ml. of 0.9% sodium chloride-0.0025 M/tris buffer and 0.0004 M potassium chloride of pH 8.7, Temp.=30° C.

Enzymes added at the following levels—(a) 0, (b) 30 μg. of α per ml., (c) 3 μg. of α per ml., (d) 18 μg. of β per ml., (e) 2 μg. of β per ml.

At the end of 24 hrs. incubation on a rotary shaker, all 4 worms in beakers (a), (b) and (c) were viable and moving actively. Worms in (d) and (e) were dead and their cuticles wrinkled and loose.

The β-enzyme is shown by tests to have good antinematode activity.

(b) The action of the β-enzyme on larval *Oesophagostomum* (from sheep faeces) was observed under the microscope. After 2 hrs. exposure to an approximately 0.001% solution of β-enzyme, the cuticles of the larvae were noticeably wrinkled and active motion had ceased.

EXAMPLE 10

Test on sheep-tapeworm (*Moniezia expansa*)

In the same buffer as for Example 9a above, segments of this tape-worm were readily disintegrated by the α-enzyme (0.002% wt./vol. solution) but appeared to be comparatively unaffected by the β-enzyme (also a 0.002% solution).

I claim:

1. A method for isolating proteases including the α- and β-bacteriolytic proteases produced by myxobacter Sorangium strain 495 comprising growing the Sorangium on a medium containing assimilable nitrogen sources, carbon sources and mineral salts including zinc under aerobic conditions at about 20 to 35° C. until extracellular enzymes have accumulated in the medium, removing the cells, contacting the filtrate with a mixed bed of neutralized ion exchange resins at about neutral pH, adjusting the treated solution to a weakly acid pH and contacting with a weakly acidic cation exchange resin at a pH not more than about 5 until the proteolytic enzymes are adsorbed, dispersing the resin with adsorbed enzymes in buffer or salt solution of ionic strength greater than about 0.1, adjusting the pH of the dispersion to at least about 5.5 to 6.5, and recovering the desorbed enzymes.

2. The method of claim 1 wherein the cation exchange resin with adsorbed enzymes is washed with buffer of ionic strength not more than about 0.1 and of pH not greater than about 5.5 to remove impurities other than the α- and β-enzymes, the washed and partially neutralized resin is dispersed in buffer or salt solution of ionic strength greater than 0.1 and the pH raised to at least about 5.5 to 6.5 to desorb the α- and β-enzymes.

3. The method of claim 2 wherein after removing impurities other than α- and β-enzymes from the resin, the α- and β-enzymes are sequentially desorbed by a buffer or salt solution of gradually increasing ionic strength.

4. The method of claim 3 wherein the ionic strength is increased in distinct steps.

5. The method of claim 2 wherein the α- and β-enzymes are purified further by readsorption on the cation exchange resin and redesorption with selective buffer or salt solutions of increasing ionic strength and pH.

6. The method of claim 2 wherein the β-enzyme is purified further by precipitation from solution with ammonium sulfate and the precipitated enzyme recovered.

7. The method of claim 2 wherein the enzymes are recovered as salt-free powders by precipitating with ammonium sulfate, dialyzing the precipitated enzyme against salt solution and against water, and freeze drying the dialyzed solution.

8. The method of claim 3 wherein buffers with a monovalent cation concentration of about 0.14 to 0.2 M and pH of about 5.5 to 6.5 are used to desorb the β-enzyme selectively, and buffers with a monovalent cation concentration of about 0.25 to 0.35 M and pH of about 5.5 to 6.5 are then used to desorb the α-enzyme.

9. The method of claim 1 wherein the cation exchange resin is a finely divided carboxylic type which has been partially neutralized with monovalent base.

10. The method of claim 1 wherein the mixed bed includes a weakly basic anion exchange resin in acetate form and a strongly acidic cation exchanger in ammonium form.

11. The method of claim 1 wherein zinc is present in the medium in amounts up to about 1 mg./l.

12. The method of claim 1 wherein the cells are removed after about 40–50 hours growth.

13. The method of claim 1 wherein after the enzymes are adsorbed the resin is washed with low ionic strength acetate buffer of pH about 5, then dispersed in citrate buffer with monovalent cation concentration of about 0.1 M and pH about 6, the pH of the dispersion then raised to about 6–6.5, and the β- and α-enzymes desorbed sequentially by treating the resin with citrate buffer with monovalent cation concentration of 0.15 to 0.2 M and pH of 5.7–6.2 to desorb the β-enzyme, followed by the same buffer of 0.25–0.3 M and increased pH within the range 5.7–6.2 to desorb the α-enzyme.

14. Alpha bacteriolytic serine protease, an extracellular metabolite of myxobacter Sorangium strain 495 having high enzyme production, characterized by molecular weight about 20,000, an amino acid sequence at the active serine site of —Asp—Ser—Gly—, lysing various bacteria by cleaving amide or peptide linkages, solubilizing fibrin at pH 6–8, having an absorptivity at 280 millimicrons of approximately 0.9, being readily inhibited by diisopropyl phosphorofluoridate, containing inter alia the following residues or components (moles per mole of enzyme): histidine 1, lysine 2, arginine 12, leucine 10, isoleucine 8, tyrosine 4, with no free thiol groups, and being active against parasitic cestodes.

15. Beta bacteriolytic protease, an extracellular metabolite of myxobacter Sorangium strain 495 having high enzyme production, characterized by molecular weight about 20,000, being not inhibited by diisopropyl phosphorofluoridate, crystallizing in acicular form, containing one atom of zinc per molecule, lysing various bacteria by cleaving amide or peptide linkages, solubilizing fibrin at pH 6–8, having an absorptivity at 280 millimicrons of about 2, containing inter alia the following components in moles per mole enzyme: histidine 8, lysine 3, argine 5, leucine 9, isoleucine 4, tyrosine 13, with no free thiol groups, and being active against nematodes.

16. The beta enzyme of claim 15 wherein the atom of zinc has been removed.

17. The beta enzyme of claim 15 wherein the zinc has been replaced by a divalent metal ion.

18. An enzyme mixture consisting essentially of alpha- and beta-bacteriolytic proteases, extracellular metabolites of myxobacter Sorangium strain 495.

References Cited

Gillespie, D. C., et al.: Canadian Journal of Microbiology, vol. 11, No. 1, February 1965 pp. 109–118.

Dixon et al.: Enzymes, 2nd ed., 1964, pp. 26–36 and 41–44.

LIONEL M. SHAPIRO, Primary Examiner

U.S. Cl. X.R.

195—66; 424—94